United States Patent [19]

Gelardi et al.

[11] 4,339,162
[45] Jul. 13, 1982

[54] VIDEO CASSETTE STORAGE BOX

[75] Inventors: Anthony L. Gelardi; Paul J. Gelardi, both of Cape Porpoise; Robert B. MacLeod, Jr., Kennebunkport, all of Me.

[73] Assignee: Shape, Inc., Biddeford, Me.

[21] Appl. No.: 125,446

[22] Filed: Feb. 28, 1980

[51] Int. Cl.³ .................... A47B 81/06; F16B 12/00
[52] U.S. Cl. ............................... 312/10; 312/12; 312/14; 312/111; 312/322; 206/387; 16/DIG. 13
[58] Field of Search ............... 312/10, 11, 108, 111, 312/311, 319, 322, 323, 12, 14; 206/387; 220/339; 16/DIG. 13

[56] References Cited

U.S. PATENT DOCUMENTS

| | | | |
|---|---|---|---|
| 462,302 | 11/1891 | Cook | 312/301 |
| 3,552,817 | 1/1971 | Marcolongo | 312/111 |
| 3,603,478 | 9/1971 | Common | 220/339 |
| 3,744,601 | 7/1973 | Doppelt | 16/DIG. 13 |
| 3,812,960 | 5/1974 | Falletta et al. | 206/387 |
| 3,904,259 | 9/1975 | Hoffmann et al. | 312/111 |
| 3,975,071 | 8/1976 | Quinn | 312/323 |
| 3,990,574 | 11/1976 | Roccaforte | 206/387 |
| 3,998,324 | 12/1976 | Roccaforte | 206/387 |
| 3,999,818 | 12/1976 | Schankler | 312/111 |
| 4,111,502 | 9/1978 | Kessler | 312/10 |
| 4,118,616 | 10/1978 | Wittkamp et al. | 206/387 |
| 4,140,219 | 2/1979 | Somers | 206/387 |
| 4,265,369 | 5/1981 | Aboussouan | 206/387 |

*Primary Examiner*—Victor N. Sakran
*Attorney, Agent, or Firm*—Staas & Halsey

[57] ABSTRACT

The video cassette storage box is of two-piece modular construction having a storage compartment slightly larger than the normal size video cassette and provided with interlocking dovetail structure at each of the four corners so that a plurality of storage boxes may be interlocked together, either vertically or horizontally. The box construction is of elongated rectangular shape, with an overall thickness substantially less than that of the width and length and open along one portion thereof. Mounted within the storage box is a slidable tray provided with an opening tab at one end connected to the tray by a living hinge, and provided at the other end with a tongue for engagement with the edge of a video cassette for the purpose of engaging and pulling same out of the box along with the tray. The front tab with living hinge permits the label area of the video cassette to be clearly visible at all times when the cassette is being stored within the storage box. A limit projection on the tray in association with a slot in the storage box determines the normal opening range of the slidable tray while detent balls on the front tab and depressions in the inner walls of the storage box reasonably secure the front tab in a closed position.

7 Claims, 3 Drawing Figures

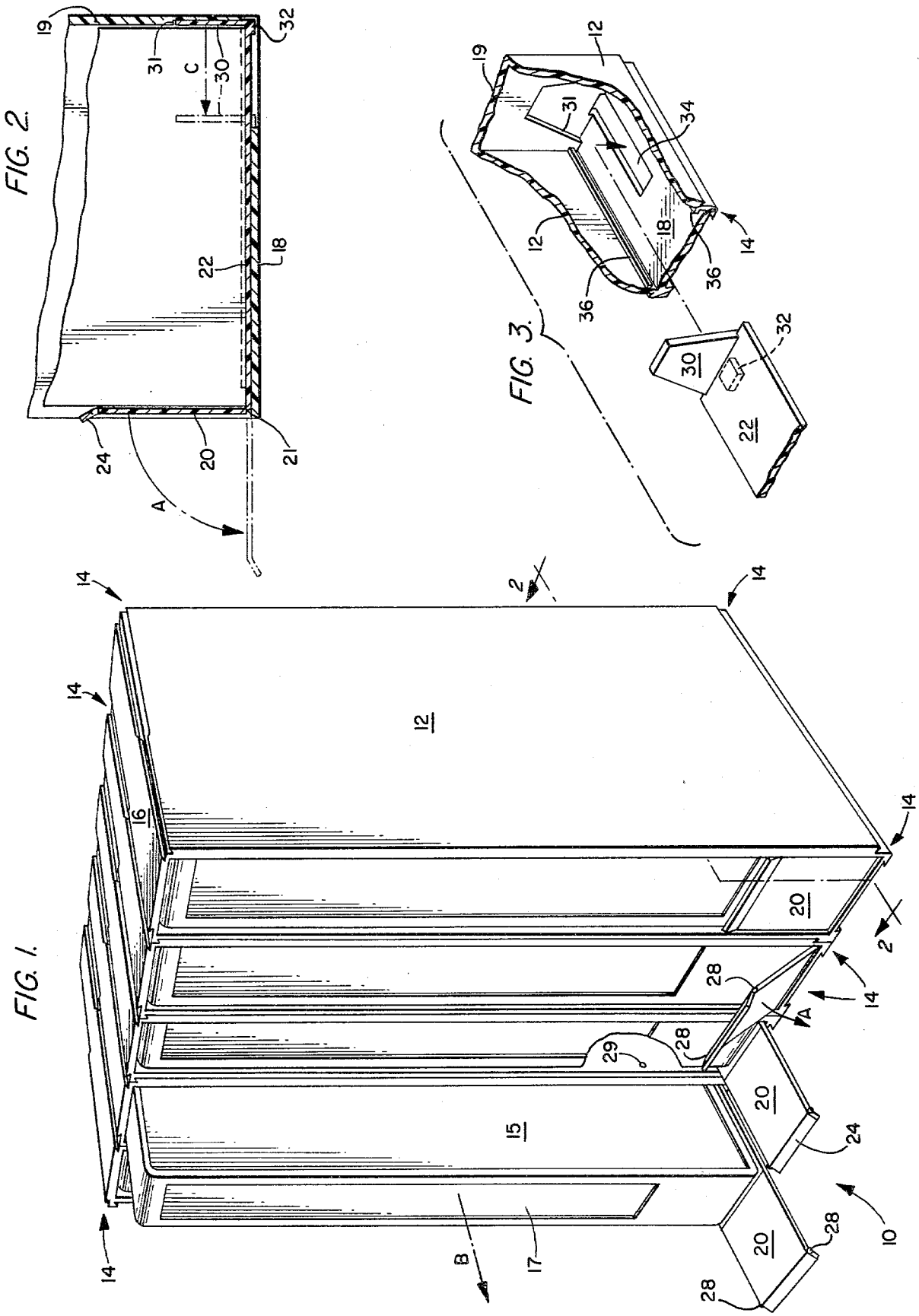

VIDEO CASSETTE STORAGE BOX

BACKGROUND OF THE INVENTION

1. Field of the Invention

This invention relates generally to storage boxes for use in storing video cassettes.

2. Description of the Prior Art

A common problem with known type storage devices for cassettes and similar devices is that the structure does not permit a secure and safe storage for the cassette, yet permit quick and easy selection of a desired cassette, and then quick and easy removal thereof from the storage device.

Another common problem of known storage devices is that many associated parts and members are normally required which substantially increases the overall complexity of the storage device, and also greatly increase the risk of malfunction or inoperability of some of the component pieces.

Another common problem with such type storage devices having many different parts, is the increased cost of manufacture and assembly, as well as the reduced reliability thereof.

Known prior patents which show the state of the present art and over which this invention is an improvement are as follows:

| INVENTOR | U.S. PAT. NO. |
|----------|---------------|
| Cook | 462,302 |
| Common | 3,603,478 |
| Roccaforte | 3,998,324 |
| Kessler | 4,111,502 |

The Cook patent discloses a drawer with the sides provided near the lower edges thereof with grooves for the reception of a slidable slab. This slidable slab provides a shelf which can be pulled out of the drawer and also has associated therewith a hinged flap for closure of the drawer.

The Common patent (3,603,478) discloses a tape cassette storage device having a plurality of compartments with each compartment having a lid element provided with a hinge area, an elongated cover member, and a latch member disposed at substantially right angles thereto. Spring fingers at the rear of the respective compartments normally urge the tape cassettes outwardly from the compartments when the hinged lid is opened.

The patent to Roccaforte (3,998,324) discloses a container wherein a flap end is used to pull out a cassette cartridge.

The patent of Kessler (4,111,502) discloses a plurality of slidable drawers for storing a plurality of tape cartridges for easy access in an automobile. Each drawer is also provided with a guide leg in association therewith.

None of these known prior art devices solve the known problems in the manner of subject invention.

SUMMARY OF THE INVENTION

An object of the present invention is to provide a video cassette storage device which permits quick and easy identification of a desired video cassette while it is being stored, will maintain same stored in the desired vertical position, will securely retain same in stored position, and yet will permit quick and easy removal thereof when desired.

Another object of this invention is to provide a cassette storage device which can be mounted either vertically or horizontally, can be attached and associated with a plurality of other similar storage devices through interlocking structure provided along the edges thereof, and will permit the storage and easy retrieval of cassette cartridges contained therewithin.

A further object of this invention is to provide a storage device having simple relatively maintenance free two-part construction. An overall rectangularly shaped box slightly larger than the cassette to be stored provides one unit, while a slidable tray having a movable and foldable front tab and a cassette engaging tongue and guide projection at the other end form the second component.

The storage device of the present invention has a number of new and novel features. The overall device comprises a rectangular shaped storage box of just slightly greater size than the cassettes for which it is designed. These cassettes preferably are of the video cassette type, but audio cassettes and other type structures may also be used with this device. The box is of one piece construction, preferably molded of plastic and provided along each of the four edges thereof with ridges and grooves to provide interlocking joints for stacking a plurality of similar boxes together. A front portion of the storage box is open.

Other important features of the present invention are a slidable tray provided with a guide projection mating with a guide slot in the storage box, and a cassette engaging tongue which recesses into a complementary depression provided along an inner rear area of the storage box. The other end of the tray is provided with a pivotal tab mounted by a flexible hinge area for permitting the tab to be opened and closed at the front of the box. Suitable detent balls are provided near the opening end of the hinged tab for complementary engagement with sockets provided along the inner edges of the walls of the storage box. The hinged tab is also provided with an elongated handle portion for easy grasp by the fingers of a user of the device.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a plurality of storage devices of the present invention as arranged in the vertical configuration;

FIG. 2 is a fragmentary side elevational view, partly in cross section, taken generally along lines 2—2 of FIG. 1; and FIG. 3 is a fragmentary portion in perspective of the slide tray guide projection and cassette engagement tongue together with the storage box guide slot and tongue receiving recess.

DESCRIPTION OF THE PREFERRED EMBODIMENT

Looking at FIG. 1, reference numeral 10 indicates in general the cassette storage devices of the present invention.

As shown in FIG. 1, a plurality of the cassette storage devices are connected side-by-side in vertical configuration. This is the preferred manner of storage of video cassettes.

As can best be seen in FIGS. 1 and 2 of the drawings, each individual storage box has side panels 12, end panels 16 and 18, and a rear panel 19. The front portion of each storage box is open to permit easy reception of a cassette therewithin.

Each storage box is also provided along one end panel, 18 as shown in FIG. 2, with a slide tray 22. Each of the slide trays are provided at the front portion thereof with a pivotally mounted tab 20 by flexible "living hinge" structure 21. This flexible hinge is a result of the type of plastic used for the tray and also the reduced thickness of the hinge area as best seen in the cross-sectional view of FIG. 2. Each tab 20 is also provided with an elongated diverging handle portion 24 for easy grasp thereof by a user of the device. Detent balls or projections 28 are provided at the junction of the handle portion 24 with the tab 20. These detent balls 28 mate with depressions or sockets 29 appropriately positioned along the inner wall edges of the side panels 12 of each storage box. Thus, when the slide tray is fully inserted into its respective storage box and the front tab is pivotally moved to closed position, the detent balls 28 will engage within the depressions 29 and securely lock the tab 20 in closed position. Then when a user is desirous of opening the tab 20 for removal of a desired cassette, the handle 24 is grasped and the tab pivotally moved in the direction of arrow A of FIGS. 1 and 2, to fully open the tab portion as indicated in dotted lines in FIG. 2.

Each slide tray 22 is provided at the other end thereof with an outwardly extending tongue 30 which engages with the rearmost corner of a cassette. Thus, with a cassette in place, as best seen in the left portion of FIG. 1, the tongue 30 will be in contact position therewith to move the tray inwardly of the box when the cassette is pushed while loading same into the storage device, and conversely the tongue will engage the cassette to pull same out along with the slide tray when it is desired to remove the cassette. The movement in the outward direction is indicated by arrow B in FIG. 1.

In order to prevent the slide tray from being completely removed from the storage box, and also to prevent the cassette from being pulled too far out, a limit projection 32 is provided which in association with a slot 34 in each storage box determines the limit of outward movement of each slide tray.

The extending tongue 30 provides a limit stop for inward movement of each tray in conjunction with a recessed portion 31 provided in the rear panel 19 of each storage box. Thus, as can be seen by the arrow C in FIG. 2, the degree of movement of the slide tray is between the two limit portions.

Two side rails 36 are provided internally of each storage box near the end panel 18 which will prevent the slide tray from coming out of its respective storage box when no cassette is present therein.

Preferably the two components for the overall device are formed and molded of plastic material. The storage box itself is molded as one single component, while the slide tray with its flexible hinge portion and pivotally mounted tab with detent balls, and the tongue 30 and limit projection 32, is molded as the second component piece. During assembly the slide tray is inserted all the way into a storage box, and then depressed and snapped past the guide rails 36 to secure the slide tray in proper mounted position within the box. Thus, assembly of a completed box structure is relatively simple, quick and easy. Once assembled, the simple two component overall storage device is relatively maintenance free, very dependable, and very easy to use.

As can be easily seen by reference to FIG. 1, each video cassette is provided with a label area 17 which contains desired information about the material which has been recorded on the tape of the cassette. By making the front tab 20 relatively small in proportion to the overall opening, the label area is completely available and exposed for easy viewing. This is another important feature of this invention.

As also shown in FIG. 1, the four edges of each storage box are provided with grooves and ridges 14 for interlocking a plurality of the storage boxes together in a number of different manners. The boxes may be interlocked side-by-side in a vertical configuration as shown in FIG. 1, and they can also be stacked upon each other, either above or below those as shown in FIG. 1. Thus, a great number of individual storage boxes may be interconnected to form a mass storage structure for many, many cassettes.

While preferably this device will be used with video cassettes, it can also be used with audio cassettes, and other types of cassette devices. Also, it is envisioned that educational materials such as training manuals, booklets, pamphlets, and other type of materials which have label or information areas along an edge thereof, may be suitably stored by the use of the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention.

We claim:
1. A cassette storage device comprising:
a one-piece box having an opening along one area thereof;
a tray slidably mounted in said box for movement in and out of said opening;
pivotally mounted opening and closing means provided with said tray for association with the box opening;
limit means provided with each tray for determining the amount that said tray can be moved out of said opening;
the opening and closing means including a movable tab pivotally connected to the slidable tray by a flexible hinge portion;
the movable tab being provided with a handle portion to enable quick and easy grasp by a user of the device, and further including locking means on the tab for association with the storage box to secure the tab in a closed position thereof;
said limit means including a projection provided on the slide tray which complements with a slot provided in the storage box;
a tongue for engagement with a cassette mounted on said tray, and a recessed portion provided within said storage box for complementary reception of said tongue therewithin.
2. The device of claim 1, together with interlocking means provided on the outer edges of said storage box so that a plurality of said storage boxes may be connected together.

3. A cassette storage device comprising:
a one-piece box having an opening along one area thereof;
a tray slidably mounted in said box for movement in and out of said opening;
opening and closing means provided with said tray for association with the box opening;
limit means provided with each tray for determining the amount that said tray can be moved out of said opening, said limit means including a projection provided on the slidable tray which complements with a slot provided in the storage box, a tongue for engagement with a cassette mounted on said tray, and a recessed portion provided within said storage box for complementary reception of said tongue therewithin.

4. The device of claim 3, together with interlocking means provided on the outer edges of said storage box so that a plurality of said storage boxes may be connected together.

5. A video cassette storage device comprising:
a plurality of storage boxes interconnected by disengagable interlocking means along a plurality of edges thereof so that a number of like individual storage boxes can be stacked side-by-side and vertically on top of each other, each said individual storage box being provided with a slidable tray for supporting a video cassette thereupon, each slidable tray being provided with a front opening and closing tab connected to the slidable tray by a flexible hinge area of a reduced thickness together with detent locking structure, a rear mounted cassette engaging tongue, and tray slidable movement limit structure, said rear mounted cassette engaging tongue comprising a projection extending traversly from the rear of the slidable tray, and a recessed portion provided within each storage box for complementary reception of the tray cassette engaging tongue therewithin when the tray is slid all the way to the rear of the storage box.

6. The device of claim 5, wherein said detent locking structure comprises at least one detent ball provided on said tab, and at least one complementary depression provided along an inner wall edge of each individual storage box.

7. A video cassette storage device comprising:
a plurality of storage boxes interconnected by disengagable interlocking means along a plurality of edges thereof so that a number of like individual storage boxes can be stacked side-by-side and vertically on top of each other, each said individual storage box being provided with a slidable tray for supporting a video cassette thereupon, each slidable tray being provided with a front opening and closing tab connected to the slidable tray by a flexible hinge area of a reduced thickness together with detent locking structure, a rear mounted cassette engaging tongue, and tray slidable movement limit structure, said tray slidable movement limit structure comprising a limit projection provided on the slidable tray which complements a slot provided in the storage box, said slot only being long enough to permit partial withdrawal of the slidable tray from the storage box, said detent locking structure comprising at least one detent ball provided on said tab, and at least one complementary depression provided along an inner wall edge of each individual storage box, said rear mounted cassette engaging tongue comprising a projection extending traversly from the rear of the slidable tray, and a recessed portion provided within each of said storage boxes for complementary reception of the cassette engaging tongue therewithin when the tray is slid all the way to the rear of the storage box.

* * * * *